(12) United States Patent
Franks et al.

(10) Patent No.: US 7,882,731 B1
(45) Date of Patent: Feb. 8, 2011

(54) SYSTEM FOR ACCURATELY MEASURING AND REGULATING AIR PRESSURE IN TIRES

(76) Inventors: Norman A. Franks, 17060 S. Shore La., Eden Prairie, MN (US) 55346; Michael Franks, 17060 S. Shore La., Eden Prairie, MN (US) 55346

( * ) Notice: Subject to any disclaimer, the term of this patent is extended or adjusted under 35 U.S.C. 154(b) by 88 days.

(21) Appl. No.: 12/468,348

(22) Filed: May 19, 2009

Related U.S. Application Data

(60) Provisional application No. 61/055,650, filed on May 23, 2008.

(51) Int. Cl.
*G01M 17/02* (2006.01)
(52) U.S. Cl. .................................. 73/146; 152/417
(58) Field of Classification Search .................. None
See application file for complete search history.

(56) References Cited

U.S. PATENT DOCUMENTS

| | | | | |
|---|---|---|---|---|
| 6,742,995 | B1 * | 6/2004 | Wood et al. ................ | 417/234 |
| 6,923,627 | B1 * | 8/2005 | Wood et al. ................ | 417/234 |
| 2006/0293816 | A1 * | 12/2006 | Li ............................ | 701/38 |

* cited by examiner

*Primary Examiner*—Andre J Allen
(74) *Attorney, Agent, or Firm*—Thomas J. Nikolai; Nikolai & Mersereau, P.A.

(57) ABSTRACT

Embodiments of the present invention allow an operator to select one, two, or more tires in the system to have their individual pressure measured or equalized and set by either connecting it to a compressed air supply or by bleeding out excess air to reduce tire pressure. This is all done by operating the push-button valves on the gauge handle to read and/or bleed when the push-button valve for reading is not actuated; it isolates the gauge from the compressor's air pressure during a filling phase to prevent its being damaged.

19 Claims, 3 Drawing Sheets

SYSTEM FOR ACCURATELY MEASURING AND REGULATING AIR PRESSURE IN TIRES

CROSS-REFERENCE TO RELATED APPLICATIONS

The present application claims priority to U.S. Patent Application Ser. No. 61/055,650, filed on May 23, 2008, titled System for Accurately Measuring and Regulating Air Pressure in Tires, listing Noonan A. Franks and Michael Franks as co-inventors, herein incorporated by reference in its entirety.

FIELD OF THE INVENTION

Embodiments of the present invention generally relate to tires. Particularly, embodiments of the present invention relate to tire pressure. More particularly, embodiments of the present invention relate to systems for accurately measuring and regulating air pressure in tires.

BACKGROUND

Air pressure control in tires on performance vehicles, commercial fleet vehicles, rental car fleets, over the road vehicles and most any vehicle running on inflated tires can be extremely critical. Proper tire pressure decreases tire wear, improves vehicle mileage and increases vehicle safety. In a racing environment, tire pressure is extremely critical in optimizing vehicle performance.

A Tire Pressure Monitoring System (TPMS) is an electronic system designed to monitor the apparent air pressure inside all pneumatic tires on a motor vehicle. The system is sometimes referred to as Remote Tire Pressure Monitoring System (RTPMS), or simply as a run flat indicator. It transmits data on an unencrypted radio channel which can be intercepted by third parties and traced back to the owner of the vehicle.

The first passenger vehicle to adopt a TPMS was the Porsche 959 in 1986, using a system developed by PSK. Due to vehicle safety and maintenance economy, TPMS appeared more widely in Europe as an optional feature for top range luxury passenger vehicles, like the Audi A8, Mercedes-Benz S-Class and the BMW 7 Series. In 1999 the PSA Peugeot Citroen decided to adopt a TPMS as a standard feature on the Peugeot 607. The following year Renault launched the Laguna II, the first high volume mid-size passenger vehicle in the world to be equipped with a TPMS as a standard feature.

The Firestone recall in the United States in the late 1990s which was attributed to more than 100 deaths from rollovers following a tire tread-separation pushed the Clinton administration to publish the TREAD Act. This act mandates the use of a suitable TPMS technology in order to alert drivers of a severe under-inflation condition of their tires. This act affects all light motor vehicles (less than 10,000 lb) sold after Sep. 1, 2007.

Phase-in started in October 2005 at 20%, and reached 100% for models produced after September 2007. While in the United States, TPMS legislation grew from safety-related motives; European Union (EU) and Far East legislators are looking at TPMS as a way of reducing $CO_2$ emissions, and are presently considering compulsory TPMS from this environmental stance.

Regardless of United States and EU legislation, the introduction by several tire manufacturers of nm-flat tires makes it mandatory for car manufacturers to fit a system where the drivers are made aware the run-flat has been damaged. The run-flats are designed to be used at no more than 80 km/h (50 mph) for no more than a distance of 80 km (50 miles), and this is why it is mandatory run-flats are monitored by TPMS. Run-flats have received a mixed reception from the public due to their impact on comfort with a harder ride.

Lastly, the most recent advance with TPMS technology is the introduction of battery-less direct sensor systems which require zero maintenance and are very reliable. VisiTyre is the first of this new class of battery-less TPMS which allows pressure on demand readings immediately from ignition and unlike radio frequency TPMS systems are also transparent to all tire construction types.

Direct sensor TPMS delivers real time tire pressure information to the driver of the vehicle—either via a gauge, a pictogram display, or a simple low pressure warning light. These systems employ physical pressure sensors inside each tire, and a means of processing and sending information from inside the tire to the vehicle instrument cluster.

Direct Sensor TPMS can identify simultaneous under inflation in all four tires or in any combination of tires. Direct sensor TPMS are designed to specifically cope with the effects of changes in tire pressure due to ambient temperature changes and road to tire friction based temperature changes. Friction between the tire and road surface heats up the tire and increases the pressure in the tire. Alarm activation threshold pressures are usually set according to the manufacturer's recommended "cold placard inflation pressures".

A disadvantage of a battery powered radio frequency (RF) TPMS is the possibility the construction of certain steel belted radial replacement tires will block the very low power RF signal of the direct TPMS sensor. The power levels of battery powered TPMS are kept very low to conserve battery life and to conform to various countries communication authority standards for short range radio communications.

Another disadvantage of direct sensor TPMS is their physical sensors are quite large and they are either mounted on the end of valve stems or by a steel band around a rim's dropwell center. In both cases these sensors are subject to damage during tire removal and fitting procedures. Banded sensors may also damage the tire bead's air seal.

Indirect acting TPMS measures the "apparent" air pressure indirectly, by monitoring individual wheel rotational speeds, and other signals available outside the tire itself. Most indirect TPMS use the fact an under-inflated tire has a slightly smaller diameter than a correctly inflated tire and therefore has to rotate at a higher angular velocity to cover the same distance as a correctly inflated tire. Such TPMS cannot detect under inflation in all four tires simultaneously, since if all four tires lose the same amount of air the relative change will be zero. In the United States the TREAD Act precludes the use of any TPMS which cannot simultaneously detect under inflation of any or all four tires.

Newer developments of indirect TPMS can also detect simultaneous under-inflation in all four tires thanks to vibration analysis of individual wheels or analysis of load shift effects during acceleration and/or cornering, however, additional sensors add to the complexity and cost of this technology. A hybrid method requires adding one direct TPMS sensor to a single tire on a vehicle, thereby eliminating the four equally low tire scenarios.

Indirect TPMS is cheap and easy to implement since most modern vehicles already have wheel speed sensors for anti-lock braking systems, and electronic stability control systems. Another advantage of this technology is no maintenance of the TPMS is necessary, such as purchasing a new sensor when the battery fails in a direct RF based TPMS.

A disadvantage of an indirect system, compared to direct, is also the periodic requirement for recalibration, creating 'unsafe' windows where low tire detection is unavailable. Recalibration must be started manually when tires are changed or re-inflated. Forgetting to perform this initialization can lead to potentially dangerous false-positive or false-negative alerts. Incorrect calibration by the user (such as calibration when one or more tires are underinflated) can also cause unreliable operation.

SUMMARY OF THE INVENTION

Embodiments of the present invention include a pair of manifolds and a plurality of Schrader valve interface fittings adapted to screw onto conventional Schrader valves on tires. The first manifold comprises either a digital or an analog pressure gauge screwed into a threaded port at one end of the handle manifold. The manifold has finger grips for ease of grasping and a pair of push button valves. One push button valve, when depressed, exposes the gauge to the air pressure in the tires connected to the manifold and when closed isolates the gauge from high pressure air being fed from a compressed air source to a selected tire or tires. The second push button valve is used to bleed air from the selected tire or tires when it is desired to lower the pressure therein.

The rate at which air is allowed to bleed is controlled by a bleed orifice in the side of the manifold. The rate is determined by the orifice size of a removable and replaceable insert. The manifold also has a socket for receiving a conventional Schrader valve through which high pressure air may be applied from the compressed air supply for inflating selected ones of the several tires connected to the system. In the base of the manifold is a threaded port for receiving a fitting by which a length of tubing may be coupled between the gauge handle and either a second manifold or directly to a single one of the tires involved.

The second manifold is a box-like structure having a plurality of threaded bores in its top surface for receiving fittings receiving one end of the tubes extending between this rectangular box-like manifold and the valve interface fittings attached to the Schrader valves on the tires. Associated with each of the tube-end receptacles is a toggle valve projecting out from the side edges of the box-like manifold. The toggle valves operate between an open position and a closed position to complete or block connection of a selected tire to the first manifold, i.e., the gauge.

In creating the Schrader valve interface fittings, a standard valve has been modified by substituting a brass pin for a plastic insert whereby attaching a male fitting to the adapter will cause the Schrader valve to assume an open state. When the male fitting is removed, the valve re-closes.

Embodiments of the present invention allow an operator to select one, two, or more tires in the system to have their individual pressure measured or equalized and set by either connecting it to a compressed air supply or by bleeding out excess air to reduce tire pressure. This is all done by operating the push button valves on the manifold to read the gauge and/or bleed when the push button valve for reading is not actuated; it isolates the gauge from the compressor's air pressure during a filling phase to prevent its being damaged.

DESCRIPTION OF THE PREFERRED EMBODIMENT

Figure 1:
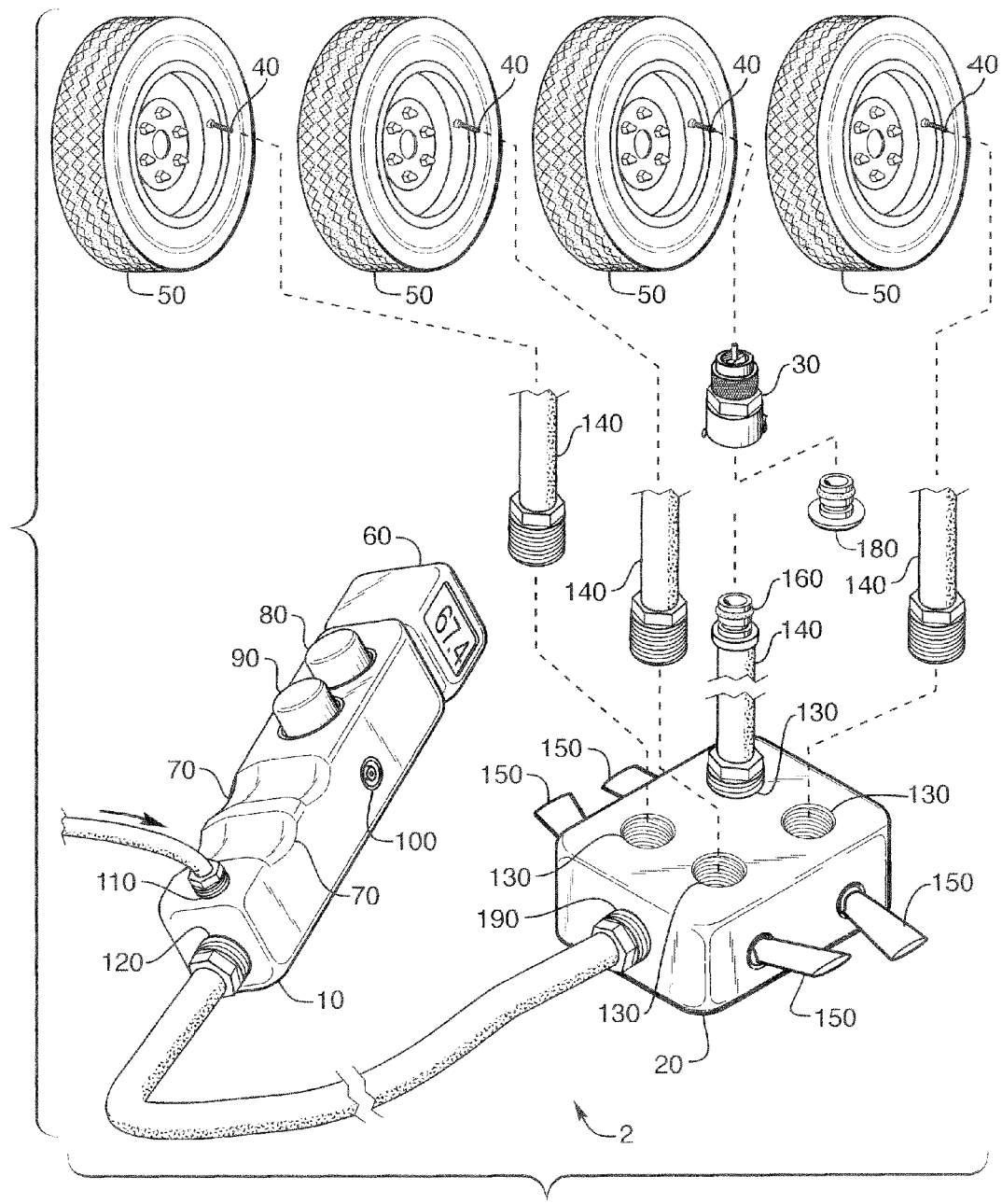
FIG. 1 shows a front profile view of a tire pressure monitoring system in an embodiment of the present invention.

The following discussion is presented to enable a person skilled in the art to make and use the present teachings. Various modifications to the illustrated embodiments will be readily apparent to those skilled in the art, and the generic principles herein may be applied to other embodiments and applications without departing from the present teachings. Thus, the present teachings are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of the present teachings. Skilled artisans will recognize the examples provided herein have many useful alternatives and fall within the scope of the present teachings.

With reference to FIG. 1, a front profile view of a tire pressure monitoring system 2 in an embodiment of the present invention is shown. Embodiments of the present invention include a first and second manifold labeled 10 and 20. A manifold, in systems for moving fluids or gases, is a junction of pipes or channels typically bringing one into many or many into one. Interface fittings 30 are adapted to screw onto Schrader valves 40 on tires 50. A Schrader valve 40 consists of a hollow cylindrical metal tube, typically brass, with the exterior end threaded. (It is fully contemplated flush mounted Schrader valves could be implemented in the present invention without departing from the spirit of the invention.) In the center of the exterior end is a metal pin pointing along the axis of the tube; the pin's end is approximately flush with the end of the valve body.

Generally, all Schrader valves used on tires have threads and bodies of a single standard size at the exterior end, so caps and tools generally are universal for the valves on all pneumatic tires on automobiles, bicycles, and even lawnmowers, hand trucks and wheelbarrows (at least in the United States). Most air hose fittings for inflating tires, generally referred to as chucks, actually are not threaded; instead, they seal to the threads by compressing a rubber collar around the threads, or they simply seal to the end of the valve tube with a gasket (usually of rubber) which is sealed by manual pressure. For the former type, the threads are still important because they have essentially the same effect as concentric ridges around the valve tube, giving the rubber something to conform around for a firm grip against the force of pressure, which would tend to push the fitting off of the valve. Both tire chucks and tire gauges include a built in fixed pin to depress the valve core's stem as you apply the tool to the valve. Depressing the pin is also the method for manually relieving the pressure retained by the valve (for example, when a tire is over-inflated or needs to be deflated but the core removal tool is unavailable). As mentioned above, a pressure gauge, when pressed firmly onto the end of a valve, depresses the pin to open the valve so the pressure inside can be measured.

Figure 2:
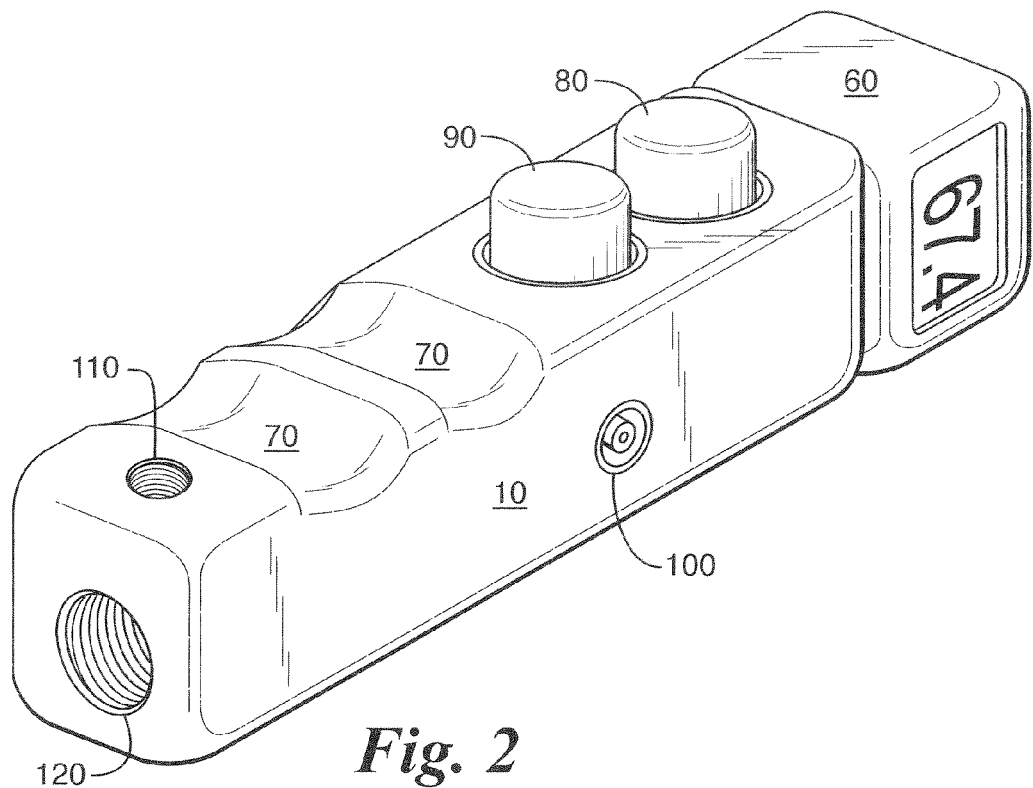
FIG. 2 shows a handle manifold in an embodiment of the present invention.

With reference to FIGS. 1 and 2, first manifold 10 is a handheld manifold and can have either a digital or an analog pressure gauge 60 coupled to one end. It is preferable for the pressure gauge 60 to be coupled to the handheld manifold 10 by having the pressure gauge 60 screwed onto a threaded port at one end of first manifold 10. Other means of coupling the pressure gauge 60 to the first handheld manifold 10 are contemplated as well. First handheld manifold 10 has finger grips 70 for ease of grasping and a pair of push button valves 80 and 90. A first push button valve 80, when depressed or engaged, exposes pressure gauge 60 to the air pressure in tires 50 connected to first handheld manifold 10 and when closed or disengaged isolates pressure gauge 60 from high pressure air being fed from a compressed air source to a selected tire or tires 50. Second push button valve 90, when engaged, is used to bleed air from a selected tire or tires 50 when it is desired to lower the pressure therein.

The rate at which air is allowed to bleed is controlled by a bleed orifice 100 in the side of first handheld manifold 10. The bleed rate is determined by the size of a removable and replaceable insert within orifice 100. First handheld manifold 10 also has a socket 110 for receiving conventional Schrader valve 40 through which high pressure air may be applied from a compressed air supply for inflating selected ones of the several tires 50 connected to system 2. In the base of first handheld manifold 10 is a first threaded port 120 for receiving a fitting by which a length of tubing may be coupled between first handheld manifold 10 and either a second manifold 20 or directly to a single one of the tires 50 involved. If first handheld manifold 10 is coupled to second manifold 20, the length of tubing may be received in a second threaded port 190 on second manifold 20 which is adapted for receiving the length of tubing.

First handheld manifold 10 is preferably a size which an average adult may comfortably hold in one hand. It is contemplated, however, that the length of the first handheld manifold can be in the range of one foot to one inch, the width can be in the range of six inches to a quarter of an inch, and the height can be in the range of six inches to half an inch. In preferred embodiments first handheld manifold 10 is approximately five inches in length, one inch in width, and one and half inches in height.

Figure 3:
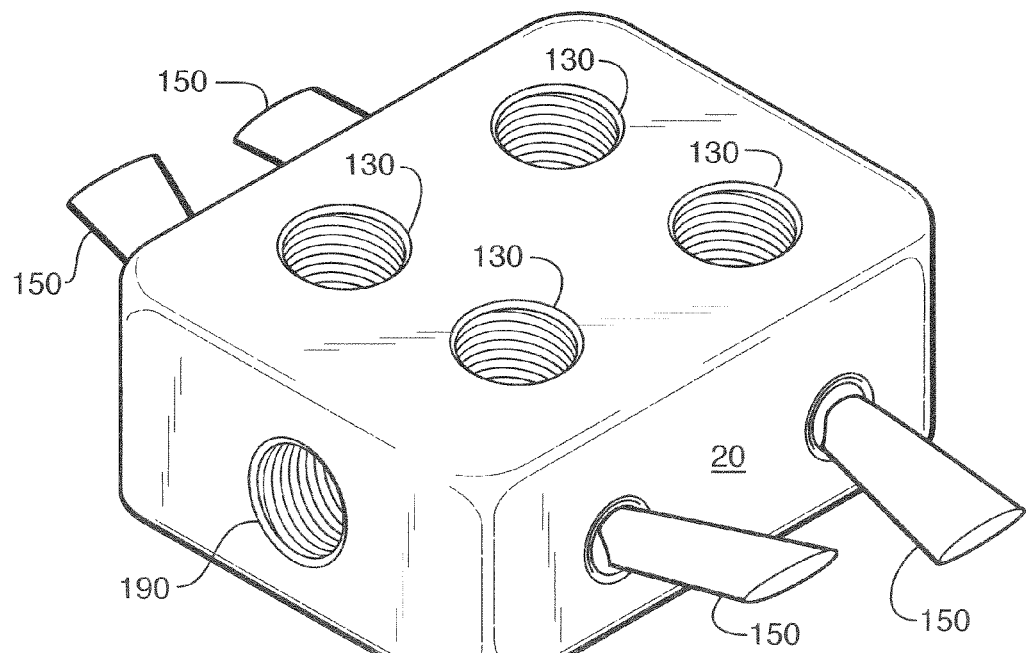
FIG. 3 shows a second manifold in an embodiment of the present invention.

With reference to FIGS. 1 and 3, second manifold 20 is a box-like structure having a plurality of threaded bores 130 in its top surface for receiving one end of tubes 140 extending between second manifold 20 and the valve interface fittings 30 attached to Schrader valves 40 on tires 50. It is preferred that there is the same number of threaded bores as there are tires. The second manifold 20 is preferably a size which is portable. It is contemplated, however, that the length of the second manifold 20 is in a range of one foot to one inch, the width is in a range of one foot to one inch, the height is in a range of one foot to a quarter of an inch. In preferred embodiments the length of second manifold 20 is approximately three and half inch, the width is approximately two and half inches, and the height is approximately one and quarter inch. Associated with each threaded bore 130 is a toggle valve 150 projecting out from the side edges of second manifold 20. Toggle valves 150 operate between an open position and a closed position to complete or block connection of a selected tire 50 to first manifold 10, e.g., gauge 60.

Figure 4:
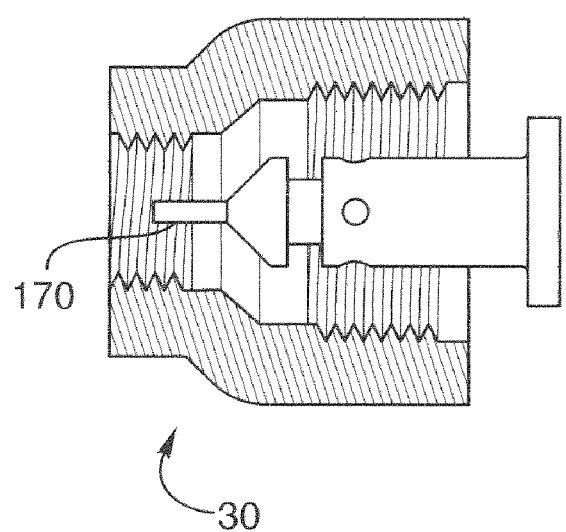
FIG. 4 shows an interface fitting in an embodiment of the present invention.
Figure 5:
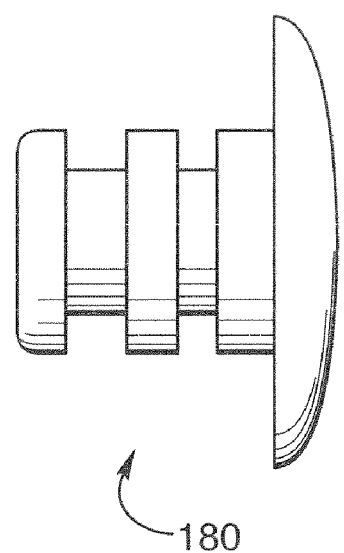
FIG. 5 shows an adapter cap in an embodiment of the present invention.

With reference to FIGS. 1 and 4, Schrader valve interface fittings 30 are created by modifying a standard quick-connect valve fitting substituting a brass pin 170, which is used to press upon the Schrader valve metal pin, for a plastic insert. Therefore, when snap fitting 160 is inserted into interface fitting 30, brass pin 170 presses against the metal valve pin of Schrader valve 40 which assumes an open state. When snap fitting 160 is removed, Schrader valve 40 re-closes. Further, when snap fitting 160 is removed, adapter cap 180 can be inserted into interface fitting 30 to prevent dirt and other materials from getting within interface fitting 30.

Embodiments of the present invention allow an operator to select one, two, or more tires 50 in system 2 to have their individual pressure measured or equalized and set by either connecting it to a compressed air supply or by bleeding out excess air to reduce tire pressure. This is all done by operating first and second push button valves 80 and 90 on first handheld manifold 10 to read and/or bleed when first push button valve 80 for reading is not actuated; it isolates the gauge 60 from the compressor's air pressure during a filling phase to prevent its being damaged.

Thus, embodiments of the SYSTEM FOR ACCURATELY MEASURING AND REGULATING AIR PRESSURE IN TIRES are disclosed. One skilled in the art will appreciate the present teachings can be practiced with embodiments other than those disclosed. The disclosed embodiments are presented for purposes of illustration and not limitation, and the present teachings are limited only by the claims follow.

The invention claimed is:

1. A tire pressure monitoring system comprising:
   a first handheld manifold having at least two finger grips, first and second push button valves, and a plurality of openings;
   a second manifold having a plurality of threaded bores, a plurality of toggle valves, and a plurality of tubes which connect the second manifold to at least one tire;
   at least one tube which couples the first handheld manifold to the second manifold; and
   a pressure gauge.

2. The tire pressure monitoring system of claim 1, wherein the first push button valve exposes the pressure gauge to the air pressure in at least one of the tires.

3. The tire pressure monitoring system of claim 1, wherein engaging the second push button valve releases air from at least one tire.

4. The tire pressure monitoring system of claim 1, wherein one of the plurality of openings is a threaded port which is adapted to receive a fitting which is coupled to a length of tubing.

5. The tire pressure monitoring system of claim 1, wherein one of the plurality of openings is a socket adapted to receive a Schrader valve.

6. The tire pressure monitoring system of claim 1, wherein one of the plurality of openings is an orifice which air from at least one of the tires may flow through.

7. The tire pressure monitoring system of claim 1, further comprising an interface fitting.

8. The plurality of toggle valves of claim 1, wherein each valve is associated with one of the plurality of threaded bores and projects from the side edges of the second manifold.

9. The plurality of threaded bores of claim 8, wherein each of the threaded bores is coupled to a specific tire.

10. A tire pressure monitoring system comprising:
    a handheld manifold having at least a first and second push button valves, and a plurality of openings;
    at least one length of tubing connecting the first handheld manifold to at least one tire; and
    a pressure gauge coupled to the handheld manifold.

11. The tire pressure monitoring system of claim 10, wherein one engaging the first push button valve exposes the pressure gauge to the air pressure in at least one of the tires.

12. The tire pressure monitoring system of claim 10, wherein engaging the second push button valve causes air to be released from the at least one tire.

13. The tire pressure monitoring system of claim 10, wherein the pressure gauge is coupled to the handheld manifold by screwing the pressure gauge onto the handheld manifold.

14. The tire pressure monitoring system of claim 10, further comprising an interface fitting.

15. The tire pressure monitoring system of claim 14, wherein the interface fitting is coupled at one end to a tire and the other end to one end of a length of tubing and wherein the other end of the length tubing is coupled to the handheld manifold.

16. The tire pressure monitoring system of claim 10, wherein one of the plurality of openings is a threaded port which is adapted to receive a fitting.

17. The tire pressure monitoring system of claim 10, wherein one of the plurality of openings is a socket adapted to receive a Schrader valve.

18. The tire pressure monitoring system of claim 10, wherein one of the plurality of openings is an orifice which air from at least one of the tires may flow through.

19. A method of using the tire pressure monitoring system comprising the steps:
   (a) attaching an air compressor to a first handheld manifold;
   (b) coupling a second manifold to the first manifold with a tube;
   (c) coupling a pressure gauge to the first handheld manifold;
   (d) coupling an interface fitting to at least one tire on a vehicle;
   (e) coupling the interface fitting to a least one of a plurality of toggle valves by connecting one end of a tube to the interface fitting and the other end of the tube to a threaded bore disposed on the top of a second manifold;
   (f) engaging the desired toggle valve to open a connection between the corresponding tire and the second manifold; and
   (g) applying pressure to one of a pair of push buttons valves on the first handheld manifold wherein the pair of push button valve controls airflow to and from the tire.

* * * * *